(12) United States Patent
Kim

(10) Patent No.: US 12,155,063 B2
(45) Date of Patent: Nov. 26, 2024

(54) LITHIUM-SULFUR SECONDARY BATTERY

(71) Applicant: LG ENERGY SOLUTION, LTD., Seoul (KR)

(72) Inventor: Minsu Kim, Daejeon (KR)

(73) Assignee: LG ENERGY SOLUTION, LTD., Seoul (KR)

(*) Notice: Subject to any disclaimer, the term of this patent is extended or adjusted under 35 U.S.C. 154(b) by 536 days.

(21) Appl. No.: 17/601,103

(22) PCT Filed: Jul. 2, 2020

(86) PCT No.: PCT/KR2020/008650
§ 371 (c)(1),
(2) Date: Oct. 4, 2021

(87) PCT Pub. No.: WO2021/010625
PCT Pub. Date: Jan. 21, 2021

(65) Prior Publication Data
US 2022/0173382 A1 Jun. 2, 2022

(30) Foreign Application Priority Data

Jul. 18, 2019 (KR) .................. 10-2019-0086693
Jun. 30, 2020 (KR) .................. 10-2020-0080073

(51) Int. Cl.
*H01M 4/00* (2006.01)
*H01M 4/36* (2006.01)
(Continued)

(52) U.S. Cl.
CPC .......... *H01M 4/364* (2013.01); *H01M 4/362* (2013.01); *H01M 4/38* (2013.01); *H01M 4/587* (2013.01);
(Continued)

(58) Field of Classification Search
CPC ........ H01M 4/364; H01M 4/362; H01M 4/38; H01M 4/587; H01M 4/625;
(Continued)

(56) References Cited

U.S. PATENT DOCUMENTS 6,194,099 B1 * 2/2001 Gernov ................. H01M 4/625
29/623.5
2002/0009639 A1 1/2002 Miyake et al.
(Continued)

FOREIGN PATENT DOCUMENTS

CN 1412882 A 4/2003
CN 102598364 A 7/2012
(Continued)

OTHER PUBLICATIONS

Machine translation of CN 110010857, obtained Apr. 2024 (Year: 2019).*
(Continued)

*Primary Examiner* — Nicholas P D'Aniello
(74) *Attorney, Agent, or Firm* — Birch, Stewart, Kolasch & Birch, LLP

(57) ABSTRACT

The present invention relates to a lithium-sulfur secondary battery, and in particular, to a lithium-sulfur secondary battery capable of obtaining high energy density compared to conventional lithium-sulfur batteries by a positive electrode comprising a sulfur-carbon composite including a catalytic site-introduced porous carbon material, and specifying conditions of the positive electrode and an electrolyte liquid.

12 Claims, 3 Drawing Sheets

(51) Int. Cl.
  *H01M 4/38*    (2006.01)
  *H01M 4/587*   (2010.01)
  *H01M 4/62*    (2006.01)
  *H01M 10/0525* (2010.01)
  *H01M 4/02*    (2006.01)
  *H01M 4/58*    (2010.01)

(52) U.S. Cl.
  CPC ....... *H01M 4/625* (2013.01); *H01M 10/0525* (2013.01); *H01M 2004/021* (2013.01); *H01M 2004/028* (2013.01); *H01M 4/5815* (2013.01)

(58) Field of Classification Search
  CPC .......... H01M 10/0525; H01M 4/5815; H01M 2004/021; H01M 2004/028; H01M 4/13; H01M 2300/0028; H01M 2300/0037; H01M 4/136; H01M 4/62; H01M 10/0569; H01M 10/052; Y02E 60/10
  See application file for complete search history.

(56) References Cited

U.S. PATENT DOCUMENTS

| | | |
|---|---|---|
| 2003/0073005 A1 | 4/2003 | Kim et al. |
| 2010/0183950 A1 | 7/2010 | Dai |
| 2011/0008531 A1 | 1/2011 | Mikhaylik et al. |
| 2011/0070494 A1 | 3/2011 | Campbell et al. |
| 2011/0104507 A1 | 5/2011 | Choi et al. |
| 2013/0029234 A1 | 1/2013 | Roev et al. |
| 2013/0040185 A1 | 2/2013 | Takase |
| 2013/0280600 A1 | 10/2013 | Uehara et al. |
| 2013/0337347 A1* | 12/2013 | Pol ...................... H01M 4/583 568/18 |
| 2014/0255786 A1 | 9/2014 | Oh et al. |
| 2014/0255796 A1 | 9/2014 | Matsuoka et al. |
| 2014/0322618 A1 | 10/2014 | Braun |
| 2014/0356736 A1 | 12/2014 | Choi et al. |
| 2016/0056452 A1 | 2/2016 | Tamura et al. |
| 2018/0062206 A1 | 3/2018 | Yang et al. |
| 2018/0175395 A1 | 6/2018 | Lee et al. |
| 2018/0248227 A1 | 8/2018 | Park et al. |
| 2018/0277913 A1 | 9/2018 | Pan et al. |
| 2018/0301739 A1 | 10/2018 | Park et al. |
| 2019/0123377 A1 | 4/2019 | Yang et al. |
| 2019/0267625 A1 | 8/2019 | Lee et al. |
| 2020/0136127 A1 | 4/2020 | Cho et al. |
| 2022/0173383 A1 | 6/2022 | Kim |

FOREIGN PATENT DOCUMENTS

| | | |
|---|---|---|
| CN | 105742659 A | 7/2016 |
| CN | 110010857 A | 7/2019 |
| EP | 3 480 881 A1 | 5/2019 |
| JP | 2001-307727 A | 11/2001 |
| JP | 2004-342337 A | 12/2004 |
| JP | 2013-503439 A | 1/2013 |
| JP | 2015-505825 A | 2/2015 |
| JP | 2016-190233 A | 11/2016 |
| JP | WO2014/157630 A1 | 2/2017 |
| JP | 2017-178859 A | 10/2017 |
| JP | 2022-528412 A | 6/2022 |
| KR | 10-2005-0038895 A | 4/2005 |
| KR | 10-2010-0113553 A | 10/2010 |
| KR | 10-2013-0014650 A | 2/2013 |
| KR | 10-2013-0018511 A | 2/2013 |
| KR | 10-1379716 B1 | 3/2014 |
| KR | 10-2014-0111516 A | 9/2014 |
| KR | 10-2014-0140686 A | 12/2014 |
| KR | 10-2015-0088913 A | 8/2015 |
| KR | 10-2016-0002253 A | 1/2016 |
| KR | 10-2016-0037084 A | 4/2016 |
| KR | 10-1622093 B1 | 5/2016 |
| KR | 10-1654136 B1 | 9/2016 |
| KR | 10-1660413 B1 | 9/2016 |
| KR | 10-2017-0023304 A | 3/2017 |
| KR | 10-2017-0023305 A | 3/2017 |
| KR | 10-2017-0092455 A | 8/2017 |
| KR | 10-2017-0121047 A | 11/2017 |
| KR | 10-1806593 B1 | 12/2017 |
| KR | 10-2018-0013499 A | 2/2018 |
| KR | 10-2018-0061034 A | 6/2018 |
| KR | 10-2018-0066615 A | 6/2018 |
| KR | 10-2018-0072122 A | 6/2018 |
| KR | 10-2018-0103275 A | 9/2018 |
| KR | 10-2018-0133063 A | 12/2018 |
| KR | 10-2019-0056484 A | 5/2019 |
| WO | WO 2011/031297 A2 | 3/2011 |
| WO | WO 2013/062056 A1 | 5/2013 |
| WO | WO 2018/007665 A1 | 1/2018 |
| WO | WO 2018/132937 A1 | 7/2018 |
| WO | WO 2019/009560 A1 | 1/2019 |

OTHER PUBLICATIONS

Cuisinier et al. "Unique behaviour of nonsolvents for polysulphides in lithium-sulphur batteries" Energy Environ. Sci, 2014, pp. 2697-2705.
Extended European Search Report for European Application No. 20840764.3, dated Aug. 19, 2022.
Flamme et al., "Guidelines to design organic electrolytes for lithium-ion batteries: environmental impact, physicochemical and electro-chemical properties", Green Chem, 2017, vol. 19, pp. 1828-1849.
Fotouhi et al., "Lithium-Sulfur Battery Technology Readiness and Applications—A Review", Energies 2017, vol. 10, No. 12, 1937, total 15 pages.
Han et al., "Scalable Holey Graphene Synthesis and Dense Electrode Fabrication toward High-Performance Ultracapacitors", ACS Nano, 2014, vol. 8, No. 8, pp. 8255-8265.
International Search Report for PCT/KR2020/008650 mailed on Oct. 8, 2020.
Lim et al., "Synergistic Effect of Molecular-Type Electrocatalysts with Ultrahigh Pore Volume Carbon Microspheres for Lithium-Sulfur Batteries", ACS Nano, 2018, vol. 12, No. 6, pp. 6013-6022, total 36 pages.
Salem et al., "Electrocatalytic polysulfide-traps for controlling redox shuttle process of Li—S battery", J. Am. Chem. Soc., 2015, vol. 137, No. 36, pp. 11542-11545.
Yang et al., "Structural Design of Lithium-Sulfur Batteries: From Fundamental Research to Practical Application", Electrochemical Energy Reviews, 2018, vol. 1, pp. 239-293.
Zeng et al., "A Safer Sodium-Ion Battery Based on Nonflammable Organic Phosphate Electrolyte", Adv. Sci., 2016, 1600066, total 8 pages.

* cited by examiner

LITHIUM-SULFUR SECONDARY BATTERY

TECHNICAL FIELD

This application claims the benefit of Korean Patent Application No. 10-2019-0086693 on Jul. 18, 2019 with the Korean Intellectual Property Office, and Korean Patent Application No. 10-2020-0080073 on Jun. 30, 2020 with the Korean Intellectual Property Office, the disclosure of which are herein incorporated by reference in their entirety.

The present invention relates to a lithium-sulfur secondary battery.

BACKGROUND ART

As application areas of secondary batteries expand to electric vehicles (EV), energy storage systems (ESS) or the like, lithium-ion secondary batteries having relatively low weight to energy storage density (~250 Wh/kg) have limits in applications for such products. On the other hand, a lithium-sulfur secondary battery has high theoretical energy density (~2,600 Wh/kg), and thereby has received attention as a next generation secondary battery technology.

A lithium-sulfur secondary battery is a battery system using a sulfur-based material having a sulfur-sulfur bond as a positive electrode active material, and lithium metal as a negative electrode active material. Such a lithium-sulfur secondary battery has advantages in that sulfur, a main material of the positive electrode active material, is very abundant in resources globally, has no toxicity and has a low atomic weight.

During discharge of a lithium-sulfur secondary battery, lithium, a negative electrode active material, is oxidized while releasing electrons and being ionized, and a sulfur-based material, a positive electrode active material, is reduced by receiving the electrons. At this time, the oxidation reaction of lithium is a process in which lithium metal releases electrons and changes into a lithium cation form. In addition, the reduction reaction of sulfur is a process in which a sulfur-sulfur bond receives two electrons and changes into a sulfur anion form. The lithium cation produced through the oxidation reaction of lithium is transferred to a positive electrode through an electrolyte, and forms a salt by bonding with the sulfur anion produced through the reduction reaction of sulfur. Specifically, sulfur before discharge has a cyclic $S_8$ structure, and this changes to lithium polysulfide ($Li_2S_x$, x=8, 6, 4, 2) through the reduction reaction, and when such lithium polysulfide is fully reduced, lithium sulfide ($Li_2S$) is eventually produced.

Due to low electrical conductivity of sulfur, a positive electrode active material, reactivity with electrons and lithium ions is difficult to secure in a solid-state form. In order to improve such reactivity of sulfur, conventional lithium-sulfur secondary batteries produce intermediate polysulfide in a $Li_2S_x$ form to induce a liquid-state reaction and improve reactivity. Herein, an ether-based solvent such as dioxolane or dimethoxyethane having high solubility for lithium polysulfide is used as a solvent of an electrolyte liquid. In addition, conventional lithium-sulfur secondary batteries build a catholyte-type lithium-sulfur secondary battery system to improve reactivity, and in this case, sulfur reactivity and lifetime properties are affected by the electrolyte liquid content due to properties of lithium polysulfide readily dissolved in the electrolyte liquid. In addition, lean electrolyte conditions are essential for high energy density, however, a lithium polysulfide concentration increases in the electrolyte liquid as the electrolyte liquid decreases making normal battery driving difficult due to a decrease in the active material mobility and an increase in the side reaction.

Such lithium polysulfide elution adversely affects battery capacity and lifetime properties, and various technologies for suppressing lithium polysulfide elution have been proposed.

As one example, Korean Patent Publication No. 2016-0037084 discloses that using a carbon nanotube aggregate having a three-dimensional structure coated with graphene as a carbon material may prevent lithium polysulfide from elution, and enhance conductivity of a sulfur-carbon nanotube composite.

In addition, Korean Patent No. 1379716 discloses that, by using a sulfur-including graphene composite, which is prepared through a method of treating graphene with hydrofluoric acid to form a pore on the graphene surface, and growing sulfur particles in the pore, as a positive electrode active material, lithium polysulfide elution is suppressed and as a result, a decrease in the battery capacity may be minimized.

By varying structures or materials of a sulfur-carbon composite used as a positive electrode active material, these patents have somewhat improved a problem of performance decline in a lithium-sulfur secondary battery through preventing lithium polysulfide elution, however, the effects are not sufficient. Accordingly, in order to build a lithium-sulfur secondary battery with high energy density, a battery system capable of driving a high loading and low porosity electrode is required, and studies on such a battery system have been continuously conducted in the art.

PRIOR ART DOCUMENTS

Patent Documents

Korean Patent Publication No. 2016-0037084 (2016 Apr. 5), SULFUR-CARBON NANOTUBE COMPLEX, METHOD OF PREPARING THE SAME, CATHODE ACTIVE MATERIAL FOR LITHIUM-SULFUR BATTERY INCLUDING THE SAME, AND LITHIUM-SULFUR BATTERY INCLUDING THE SAME Korean Patent No. 1379716 (2014 Mar. 25), LITHIUM-SULFUR SECONDARY BATTERY HAVING POSITIVE ELECTRODE WHICH IS CONSTRUCTED WITH GRAPHENE COMPOSITE INCLUDING SULFUR, AND A FORMING METHOD THEREOF

Non-Patent Documents

Abbas Fotouhi et al., Lithium-Sulfur Battery Technology Readiness and Applications-A Review, *Energies* 2017, 10, 1937

DISCLOSURE

Technical Problem

The inventors of the present invention have conducted various studies to solve the above problems, and as a result, have confirmed that a lithium-sulfur secondary battery having high energy density is obtained when using a sulfur-carbon composite including a catalytic site-introduced porous carbon material as a positive electrode active material and adjusting a positive electrode and an electrolyte liquid to be under specific conditions, and have completed the present invention.

Accordingly, an aspect of the present invention provides a lithium-sulfur secondary battery having excellent energy density.

Technical Solution

According to an aspect of the present invention, there is provided a lithium-sulfur secondary battery including a positive electrode, a negative electrode, a separator, and an electrolyte liquid, wherein the positive electrode comprises a sulfur-carbon composite including a catalytic site-introduced porous carbon material, and has an SC factor value represented by the following Mathematical Formula 1 of 0.45 or greater:

$$SC \text{ factor} = \alpha \times \frac{L}{P} \quad \text{[Mathematical Formula 1]}$$

(in Mathematical Formula 1, P, L, and α follow descriptions provided in the present specification).

The catalytic site may comprise a transition metal composite.

The catalytic site may comprise at least one selected from the group consisting of iron phthalocyanine, nickel phthalocyanine, manganese phthalocyanine, copper phthalocyanine, cobalt phthalocyanine, and zinc phthalocyanine.

The catalytic site may be included in an amount of 1% by weight to 20% by weight based on a total weight of the catalytic site-introduced porous carbon material.

The catalytic site may be positioned on at least one of an outer surface of the porous carbon material and an inner surface of the pores.

The catalytic site may bond to the porous carbon material surface through a π electron interaction.

The porous carbon material may include one or more types selected from the group consisting of graphite, graphene, reduced graphene oxide, carbon black, carbon nanotube, carbon fiber, and activated carbon.

The electrolyte liquid includes a solvent and a lithium salt, and the solvent includes a first solvent having a $DV^2$ factor value represented by the following Mathematical Formula 2 of 1.75 or less and a second solvent that is a fluorinated ether-based solvent:

$$DV^2 \text{ factor} = \gamma \times \frac{\mu}{DV} \quad \text{[Mathematical Formula 2]}$$

(in Mathematical Formula 2, DV, μ and γ follow descriptions provided in the present specification).

The first solvent may have a $DV^2$ factor value of 1.5 or less.

The lithium-sulfur secondary battery has an NS factor value represented by the following Mathematical Formula 3 of 3.5 or less:

$$NS \text{ factor} = \frac{DV^2 \text{ factor}}{SC \text{ factor}} \quad \text{[Mathematical Formula 3]}$$

(in Mathematical Formula 3, SC factor and $DV^2$ factor follow descriptions provided in the present specification).

The lithium-sulfur secondary battery has an ED factor value represented by the following Mathematical Formula 4 of 950 or greater:

$$ED \text{ factor} = V \times SC \text{ factor} \times \frac{C}{D} \quad \text{[Mathematical Formula 4]}$$

(in Mathematical Formula 4, V, SC factor, C and D follow descriptions provided in the present specification).

The first solvent may comprise at least one selected from the group consisting of propionitrile, dimethylacetamide, dimethylformamide, gamma-butyrolactone, triethylamine, and 1-iodopropane.

The second solvent may comprise at least one selected from the group consisting of 1H,1H,2'H,3H-decafluorodipropyl ether, difluoromethyl 2,2,2-trifluoroethyl ether, 1,2,2,2-tetrafluoroethyl trifluoromethyl ether, 1,1,2,3,3,3-hexafluoropropyl difluoromethyl ether, pentafluoroethyl 2,2,2-trifluoroethyl ether, and 1H,1H,2'H-perfluorodipropyl ether.

The solvent may include the first solvent in an amount of 1% by weight to 50% by weight based on a total weight of the solvent.

The solvent may include the second solvent in an amount of 50% by weight to 99% by weight based on a total weight of the solvent.

The solvent may include the first solvent and the second solvent in a weight ratio of 3:7 to 1:9.

Advantageous Effects

By adjusting a positive electrode and an electrolyte liquid to be under specific conditions, a lithium-sulfur secondary battery according to the present invention exhibits high energy density that has been difficult to obtain with conventional lithium-sulfur secondary batteries.

BEST MODE

Figure 1:
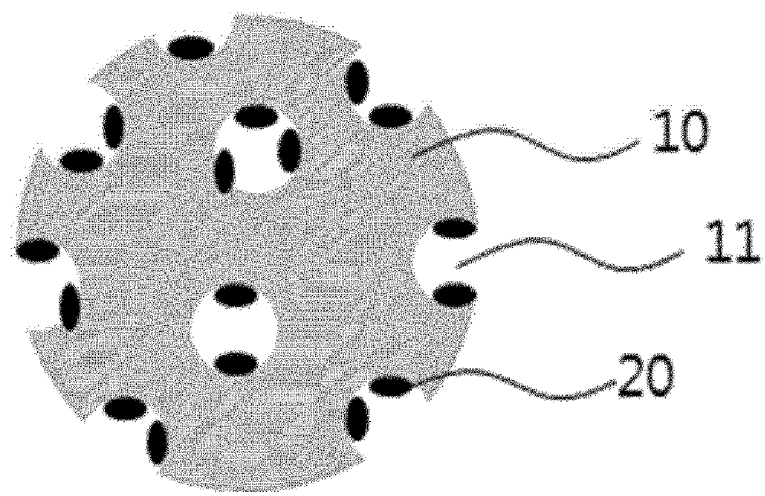
FIG. 1 is a mimetic diagram illustrating a longitudinal section of a catalytic site-introduced porous carbon material according to one embodiment of the present invention.

Hereinafter, the present invention will be described in more detail.

Terms or words used in the present specification and the claims are not to be interpreted limitedly to common or dictionary meanings, and shall be interpreted as meanings and concepts corresponding to technological ideas of the present invention based on a principle in which the inventors may suitably define the concepts of terms in order to describe the invention in the best possible way.

Terms used in the present invention are for describing specific embodiments only and do not intend to limit the present inventive. Singular forms used herein include plural forms as well, unless the context clearly indicates otherwise. In the present invention, terms such as 'include' or 'have' are to specify the presence of features, numbers, steps, behaviors, constituents, components or combinations thereof described in the specification, and need to be construed as not excluding the possibility of presence or addition of one or more of other features, numbers, steps, behaviors, constituents, components or combinations thereof in advance.

The term "composite" used in the present specification means a material combining two or more materials, and exhibiting more effective functions while forming physically and chemically different phases.

The term "polysulfide" used in the present specification is a concept including both "polysulfide ion ($S_x^{2-}$, x=8, 6, 4, 2))" and "lithium polysulfide ($Li_2S_x$ or $LiS_x^-$ x=8, 6, 4, 2)".

For properties described in the present specification, when measuring condition and method are not specifically described, the properties are measured using measuring conditions and methods generally used by those skilled in the art.

A lithium-sulfur secondary battery has high discharge capacity and energy density among various lithium secondary batteries, and has received attention as a next-generation secondary battery with an advantage of sulfur used as a positive electrode active material being abundant in resources and low-priced lowering manufacturing costs of the battery, and being environmental-friendly.

However, in conventional lithium-sulfur secondary battery systems, the lithium polysulfide elution described above is not able to be suppressed causing sulfur loss, and as a result, theoretical discharge capacity and theoretical energy density are not fully obtained in actual driving since the amount of sulfur participating in an electrochemical reaction rapidly decreases. In addition, as well as being floated or precipitated in an electrolyte liquid, the lithium polysulfide eluted as above directly reacts with lithium, and is fixed on a negative electrode surface in a $Li_2S$ form causing a problem of corroding a lithium metal negative electrode.

In the prior art, methods of introducing a material capable of suppressing lithium polysulfide elution to a positive electrode or a separator in an additive or protective layer form, changing a structure or material of a positive electrode active material, changing an electrolyte composition, and the like have been proposed. However, an effect of improving lithium polysulfide elution has been insignificant, and there are also disadvantages of having a limitation in the amount of sulfur, a positive electrode active material, to introduce (that is, loading amount), and causing a serious problem in battery stability or being inefficient in terms of process.

In view of the above, a lithium secondary battery according to one embodiment of the present invention, which comprises a positive electrode, a negative electrode, a separator, and an electrolyte liquid, includes a positive electrode having low positive electrode active material layer porosity and high sulfur loading amount using a sulfur-carbon composite including a catalytic site-introduced porous carbon material as the positive electrode active material.

When lowering porosity of positive electrode and increasing loading amount of sulfur, energy density of a secondary battery including the same generally increases. However, when lowering porosity of positive electrode to a minimum and increasing loading amount of sulfur to a maximum in a lithium-sulfur secondary battery, a ratio of an electrolyte liquid per unit sulfur content decreases, and as a result, target performance is difficult to obtain when using the above-described positive electrode in the lithium-sulfur secondary battery.

Accordingly, the present invention provides a lithium-sulfur secondary battery having higher energy density compared to conventional lithium-sulfur secondary batteries during actual operation by using, in order to enhance a reaction rate (kinetic) of an electrochemical reaction of sulfur that is a positive electrode active material when charging and discharging the lithium-sulfur secondary battery, a sulfur-carbon composite including a catalytic site-introduced porous carbon material as a sulfur carrier as a positive electrode active material, and specifying a sulfur-related condition in the positive electrode. In addition, by adjusting an electrolyte liquid to satisfy a specific condition in addition to the above-described constitution, the effect of enhancing energy density described above is further enhanced.

The positive electrode according to the present invention may include a positive electrode current collector, and a positive electrode active material layer formed on one surface or both surfaces of the positive electrode current collector.

The positive electrode current collector is not particularly limited as long as it supports a positive electrode active material layer, and has high conductivity without inducing chemical changes to the corresponding battery. For example, copper, stainless steel, aluminum, nickel, titanium, palladium, baked carbon, copper, or stainless steel of which surface is treated with carbon, nickel, silver or the like, aluminum-cadmium alloys and the like may be used.

The positive electrode current collector may strengthen binding strength with the positive electrode active material by forming micro unevenness on a surface thereof, and various forms such as films, sheets, foil, meshes, nets, porous bodies, foams, or non-woven fabrics may be used.

The thickness of the positive electrode current collector is not particularly limited, but may be, for example, from 3 μm to 500 μm.

The positive electrode active material layer may include a positive electrode active material, and selectively, a conductive additive and a binder.

The positive electrode active material includes a sulfur-based compound. The sulfur-based compound may be at least one selected from the group consisting of inorganic sulfur ($S_8$), $Li_2S_n$ (n≥1), disulfide compounds such as 2,5-dimercapto-1,3,4-thiadiazole or 1,3,5-trithiocyanuic acid, organosulfur compounds, and carbon-sulfur polymers (($C_2S_x)_n$, x=2.5 to 50, n≥2). Preferably, inorganic sulfur ($S_8$) may be used.

The sulfur-based compound alone does not have electric conductivity, and therefore, is composited with a carbon material, a conductive material.

In the present invention, the positive electrode active material is a sulfur-carbon composite obtained by compositing the sulfur-based compound and a porous carbon material, and the porous carbon material herein is a porous carbon material including a catalytic site having a catalytic effect on a reduction reaction of sulfur that is a positive electrode active material on inner and outer surfaces. The catalytic site includes a transition metal composite, and may be referred to as a catalytic site since catalytic activity for a reaction rate of the reduction reaction of sulfur may be controlled by the transition metal composite.

Hereinafter, the catalytic site-introduced porous carbon material according to the present invention will be described in more detail with reference to a drawing.

FIG. 1 is a mimetic diagram illustrating a longitudinal section of the catalytic site-introduced porous carbon material according to one embodiment of the present invention.

When referring to FIG. 1, the catalytic site-introduced porous carbon material according to one embodiment of the present invention may include a porous carbon material 10; and a catalytic site 20 bonding to inner and outer surfaces of the porous carbon material.

In the catalytic site-introduced porous carbon material according to the present invention, the porous carbon material 10 provides a skeleton capable of uniformly and stably fixing the sulfur-based compound described above, and allows an electrochemical reaction to smoothly progress by compensating low electrical conductivity of sulfur.

The porous carbon material 10 is a particle-type structure including a number of pores 11 on the inner and outer surfaces, is formed with a material with high electrical conductivity and thereby has a pore volume and a specific surface area enough to facilitate an electrochemical reaction of sulfur, and performs a role of a support of the catalytic site 20 to maintain or enhance performance, durability and efficiency of the catalytic site.

The porous carbon material 10 is prepared by carbonizing a precursor made of various carbon materials, and is not limited as long as it is commonly used in the art. For example, the porous carbon material may be at least one selected from the group consisting of graphite; graphene; reduced graphene oxide (rGO); carbon black such as denka black, acetylene black, ketjen black, channel black, furnace black, lamp black or thermal black; carbon nanotubes (CNT) such as single-walled carbon nanotubes (SWCNT) or multi-walled carbon nanotubes (MWCNT); carbon fibers such as graphite nanofibers (GNF), carbon nanofibers (CNF) or activated carbon fibers (ACF); graphite such as natural graphite, artificial graphite or expanded graphite, and activated carbon, but is not limited thereto.

The form of the porous carbon material 10 may be a globular type, a rod type, a needle type, a plate type, a tube type, or a bulk type, and may be used without limit as long as it is commonly used in the art.

The pores 11 formed in the porous carbon material 10 are formed to have a partially open shape, and inside the pores 11, sulfur that is a positive electrode active material, specifically, the sulfur-based compound described above, may be supported.

The porous carbon material 10 may be a particle having an average particle diameter of 1 μm to 50 μm and preferably 5 μm to 30 μm. When the average particle diameter is less than the above-mentioned range, lithium ion transfer efficiency may be reduced due to penetration and wetting of an electrolyte liquid, and when the average particle diameter is greater than the above-mentioned range, the volume may increase by increasing electrode pores with respect to the electrode weight.

The pores 11 formed in the porous carbon material 10 may be meso-pores having an average diameter of 2 nm to 50 nm, preferably 2 nm to 45 nm and more preferably 2 nm to 40 nm.

The pores 11 included in the porous carbon material 10 may have a pore volume of 0.5 cc/g to 3.5 cc/g, preferably 1.0 cc/g to 3.0 cc/g and more preferably 1.5 cc/g to 2.5 cc/g.

When the average diameter and the volume of the pores 11 included in the porous carbon material 10 are less than the above-mentioned range, sulfur may not be uniformly supported in each pore 11 due to pore clogging during the process of sulfur impregnation, and the amount of supported sulfur may also decrease in the pore 11 due to limitation in the pore volume. When the average diameter and the volume of the pores 11 included in the porous carbon material 10 are greater than the above-mentioned range on the contrary, the pores become macro-pores, and lithium polysulfide, an intermediate product, may be eluted together with the reaction materials in the reduction reaction of sulfur.

In addition, the porous carbon material 10 having an increased specific surface area is advantageous in terms of reactivity with sulfur and catalytic activity of the catalytic site 20 to describe later, and the specific surface area may be from 100 $m^2/g$ to 1200 $m^2/g$ and preferably from 150 $m^2/g$ to 500 $m^2/g$. When the specific surface area is less than the above-mentioned range, reactivity decreases due to a decrease in the contact area with sulfur and catalytic activity may decrease as well, and the specific surface area being greater than the above-mentioned range may have problems of an increase in the side reaction caused by the excessive specific surface area and increasing an added amount of a binder required for preparing positive electrode slurry.

The catalytic site 20 is a transition metal composite formed by a nitrogen atom bonding to a transition metal, and performs a role of a catalyst for the reduction reaction of sulfur to enhance a reaction rate (kinetic).

The catalytic site 20 includes a transition metal composite including a bond between a transition metal and a nitrogen atom, and furthermore, the catalytic site 20 includes a bond between a transition metal and a nitrogen atom and a bond between the nitrogen atom and a carbon atom. In the catalytic site 20, the transition metal composite preferably includes a transition metal and four nitrogen atoms bonding to the transition metal. When the number of nitrogen atoms bonding to the transition metal is less than 4, activity as a catalyst may be reduced, and when the number is greater than 4, structural stability decreases causing concern for a decrease in the catalytic activity. When nitrogen bonds to a transition metal as above, excellent catalytic properties are obtained as well as having a stable structure, and as a result, very high stability and catalytic effect may be obtained compared to a catalytic site formed by atoms other than nitrogen bonding to a transition metal.

The catalytic site 20 may include at least one of transition metals selected from the group consisting of iron (Fe), nickel (Ni), manganese (Mn), copper (Cu), cobalt (Co), and zinc (Zn), but is not limited thereto as long as it is a transition metal capable of having catalytic activity for a reduction reaction of sulfur.

Specifically, the catalytic site 20 is a metal-phthalocyanine (MePc), and examples thereof may include iron phthalocyanine (FePc), nickel phthalocyanine (NiPc), manganese phthalocyanine (MnPc), copper phthalocyanine (CuPc), cobalt phthalocyanine (CoPc), zinc phthalocyanine (ZnPc) and the like.

In the catalytic site 20, the transition metal and the nitrogen may have a molar ratio of 1:2 to 10, preferably 1:2 to 8 and more preferably 1:3 to 5. When the molar ratio is less than the above-mentioned range, the catalytic site is not able to be sufficiently doped to inner and outer surfaces of the porous carbon material 10 as needed, and when the molar ratio is greater than the above-mentioned range, the amount of the nitrogen per unit weight of the porous carbon material 10 increases, which may reduce catalytic activity.

The catalytic site 20 is a molecular level composite having a size of 0.1 nm to 1 nm, preferably 0.1 nm to 0.9 nm and more preferably 0.1 nm to 0.8 nm. Even when the catalytic site 20 is bonded to an inner surface of the pores of the porous carbon material 10, since there are no decreases in the pore 11 volumes and sizes, clogging of pores may be prevented even when the active material is supported inside the pores 11.

The catalytic site 20 may be positioned while being adsorbed or bonded to at least one of an outer surface of the porous carbon material 10 and an inner surface of the pores 11. Specifically, the catalytic site 20 may be adsorbed and bonded to inner and outer surfaces of the porous carbon material 10 through π electron interaction (π-π interaction). The π electron interaction has a form of bonding between surfaces instead of bonding between specific elements, and thereby has strong adsorption compared to other types of bonding, and accordingly, natural properties of the porous carbon material 10 itself may be maintained even when the catalytic site 20 bonds to inner and outer surfaces of the porous carbon material 10.

The catalytic site 20 may be included in an amount of 1% by weight to 20% by weight and preferably in an amount of 4% by weight to 16% by weight based on the total weight of the catalytic site-introduced porous carbon material of the present invention. When the content of the catalytic site 20 is outside the above-mentioned range, an effect of enhancing a reaction rate of the reduction reaction of sulfur is reduced, and a battery performance enhancing effect may be insignificant or no longer increases.

Particularly, by using the catalytic site-introduced porous carbon material described above as a sulfur carrier in the present invention, a reaction rate of the reduction reaction of sulfur is enhanced and as a result, high performance of a lithium-sulfur secondary battery including the same may be achieved. In addition, a catalytic site including a relatively low-priced transition metal instead of high priced platinum (Pt) that has been used as conventional electrochemical catalyst in the art is introduced to a surface of the porous carbon material, which is advantageous for commercialization due to low costs. In addition, by securing solid-solid (solid-state) reactivity between sulfur and an electrolyte liquid in an electrolyte liquid-including lithium-sulfur secondary battery system to describe later, enhanced discharge capacity properties are obtained in the lithium-sulfur secondary battery, and high energy density is accomplished in the lithium-sulfur secondary battery.

Next, a method for preparing the catalytic site-introduced porous carbon material according to the present invention will be described.

Figure 2:
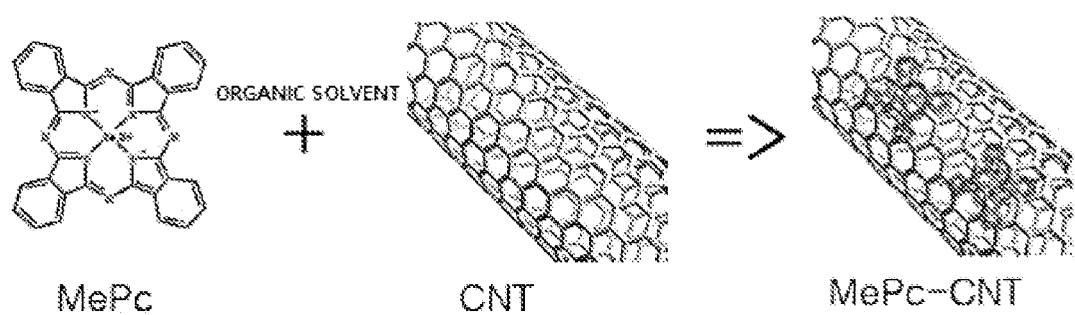
FIG. 2 is a mimetic diagram illustrating a method for preparing a catalytic site-introduced carbon material according to one embodiment of the present invention.

FIG. 2 is a mimetic diagram illustrating a method for preparing the catalytic site-introduced porous carbon material according to one embodiment of the present invention.

When referring to FIG. 2, a carbon nanotube is added as a porous carbon material to a catalytic site dispersion liquid obtained by dispersing a transition metal composite into an organic solvent to prepare a catalytic site-introduced porous carbon material in which a catalytic site bonds to the carbon nanotube surface.

Specifically, the method for preparing the catalytic site-introduced porous carbon material includes (S1) preparing a catalytic site dispersion liquid by dispersing a transition metal composite into a solvent; (S2) adding and mixing a porous carbon material to the catalytic site dispersion liquid obtained in (S1); (S3) filtering the mixture solution obtained in (S2); and (S4) drying powder obtained from filtering the mixture solution after (S3).

In (S1), a transition metal composite including a transition metal and nitrogen may be dispersed (or dissolved) in a solvent to prepare a catalytic site dispersion liquid. Preferably, the transition metal composite may be dispersed in a solvent, and the result is ultrasonic treated to prepare a catalytic site dispersion liquid.

The catalytic site dispersion liquid may have a concentration of 5% to 15%, preferably 5% to 12% and more preferably 5% to 10% based on the solid weight. When the concentration is less than the above-mentioned range, the weight of the transition metal composite included in the catalytic site dispersion liquid decreases leading to poor catalytic activity, and when the concentration is greater than the above-mentioned range, the weight of the transition metal composite increases causing pore clogging in the porous carbon material.

The transition metal composite used in the catalytic site dispersion liquid is a metal-phthalocyanine (MePC), and specific types thereof are as described above.

The metal-phthalocyanine is one type of macrocyclic compound having a structure in which rings of nitrogen atom-carbon atom cross, and has a chemical structure in which a metal ion coordinates at the center. Since the metal-phthalocyanine is used as a catalytic site, a catalytic site including a transition metal composite having a stable structure with four nitrogen atoms bonding to a transition metal may be prepared. In order to bond four nitrogen atoms to a transition metal, a multistep process such as reacting with a precursor material including a nitrogen atom and progressing an additional reaction under the ammonia ($NH_3$) atmosphere needs to be generally conducted. However, by using a metal-phthalocyanine having the chemical structure as described above as the transition metal composite in the present invention, a catalytic site including a transition metal composite having a stable structure with four nitrogen atoms bonding to a transition metal as described above may be prepared.

The solvent used in (S1) may be at least one of organic solvents selected from the group consisting of dimethyl carbonate, dimethylformamide, N-methylformamide, sulfolane (tetrahydrothiophene-1,1-dioxide), 3-methylsulfolane, N-butyl sulfone, dimethyl sulfoxide, pyrrolidinone (HEP), dimethyl piperidone (DMPD), N-methyl pyrrolidinone (NMP), N-methylacetamide, dimethylacetamide (DMAc), N,N-dimethylformamide (DMF), diethylacetamide (DEAc) dipropylacetamide(DPAc), ethanol, propanol, butanol, hexanol, ethylene glycol, tetrachloroethylene, propylene glycol, toluene, turpentine, methyl acetate, ethyl acetate, petroleum ether, acetone, cresol, and glycerol, and preferably, the transition metal composite may have high solubility when using N,N-dimethylformamide as the solvent.

Subsequently, in (S2), a porous carbon material may be added and mixed to the catalytic site dispersion liquid obtained in (S1).

The porous carbon material used in (S2) is the same as described above.

Through (S2), a process of adsorbing and bonding the catalytic site (or introducing the catalytic site) to a porous carbon material surface is conducted. In other words, the catalytic site including a transition metal composite is adsorbed and bonded on inner and outer surfaces of the porous carbon material through π electron interaction.

When adding and mixing a porous carbon material to the catalytic site dispersion liquid, the mixture solution may be obtained by ultrasonic treating and then stirring as necessary.

Herein, the amounts of the catalytic site and the porous carbon material may be properly controlled during the preparation process so that each content thereof satisfies the weight range as described above in the prepared catalytic site-introduced carbon material.

Subsequently, in (S3), the mixture solution obtained in (S2) may be filtered to remove impurities. As the filtration, general filtration methods such as a vacuum pump may be applied, and after conducting the filtration process, a washing process using an alcohol such as ethanol may be additionally conducted as necessary.

Subsequently, in (S4), powder of the mixture solution obtained from the filtration of (S3) may be dried, and the catalytic site-introduced porous carbon material according to the present invention may be finally prepared.

The catalytic site-introduced porous carbon material of the present invention has a structure in which a catalytic site including a transition metal composite bonds to inner and outer surfaces of a porous carbon material, and in order to enhance bonding strength of the porous carbon material and the catalytic site, the drying may be conducted for 10 hours to 14 hours, preferably for 10.5 hours to 13.5 hours and more preferably for 11 hours to 13 hours at a temperature of 60° C. to 100° C., preferably 65° C. to 95° C. and more preferably 70° C. to 90° C.

Figure 3:
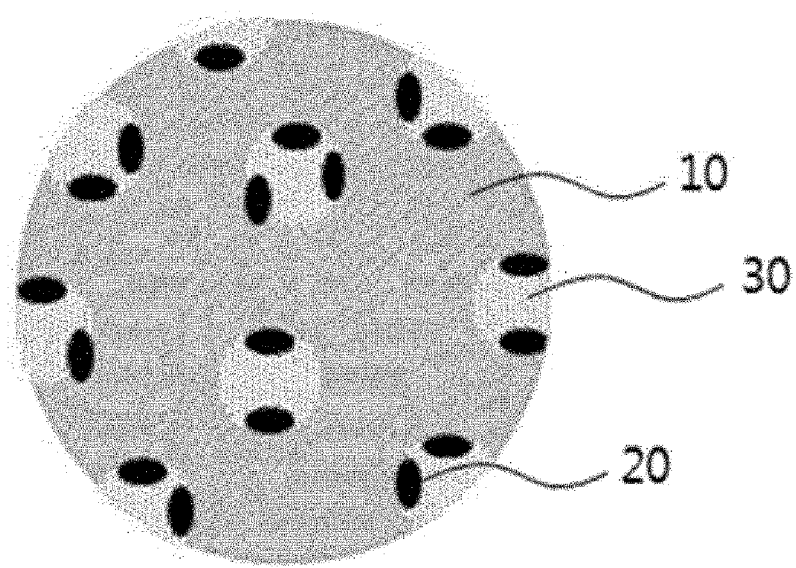
FIG. 3 is a mimetic diagram illustrating a longitudinal section of a sulfur-carbon composite according to one embodiment of the present invention.

Accordingly, as illustrated in FIG. 3, the sulfur-carbon composite of the present invention includes the catalytic site 20-introduced porous carbon material 10 described above and a sulfur series compound 30.

The sulfur-carbon composite may include a catalytic site-introduced porous carbon material and the sulfur-based compound on at least a part of the inside and the surface of the catalytic site-introduced porous carbon material.

In the sulfur-carbon composite, the sulfur-based compound and the catalytic site-introduced porous carbon material may be simply mixed to be composited, or may have a core-shell-structured coating form or a supported form. The core-shell-structured coating form means any one of the sulfur-based compound or the catalytic site-introduced porous carbon material coating the other material, and may be, for example, the catalytic site-introduced porous carbon material surface being covered by the sulfur-based compound or vice versa. In addition, the supported form may be a form of supporting the sulfur-based compound inside the catalytic site-introduced porous carbon material. The sulfur-carbon composite may have any form as long as it satisfies the content ratio of the sulfur-based compound to describe later and the catalytic site-introduced porous carbon material, and the form is not limited in the present invention.

In the sulfur-carbon composite, the sulfur-based compound may be included in an amount of 50% by weight to 90% by weight and preferably in an amount of 60% by weight to 80% by weight based on the total sulfur-carbon composite weight.

In the sulfur-carbon composite, the catalytic site-introduced porous carbon material may be included in an amount of 10% by weight to 50% by weight and preferably in an amount of 20% by weight to 40% by weight based on the total sulfur-carbon composite weight.

Accordingly, a weight ratio of the catalytic site-introduced porous carbon material and the sulfur-based compound may be from 1:1 to 1:9 and preferably from 1:1.5 to 1:4 in the sulfur-carbon composite. When the weight ratio is less than the above-mentioned range, an added amount of a binder required for preparing positive electrode slurry increases as the catalytic site-introduced porous carbon material content increases. Such an increase in the added amount of a binder resultantly increases sheet resistance of an electrode performing a role of an insulator preventing electron migration (electron pass), and cell performance may decline therefrom. On the contrary, when the weight ratio is greater than the above-mentioned range, the sulfur-based compounds aggregate by themselves, and direct participation in an electrode reaction may become difficult since the sulfur is difficult to receive electrons.

The conductive additive included in the positive electrode active material layer is a material connecting an electrolyte liquid and the positive electrode active material to perform a role of a path through which electrons migrate from a current collector to the positive electrode active material, and materials having conductivity may be used without limit.

For example, as the conductive additive, carbon black such as Super-P, denka black, acetylene black, ketjen black, channel black, furnace black, lamp black, thermal black, or carbon black; carbon derivatives such as carbon nanotubes, graphene, or fullerene; conductive fibers such as carbon fiber or metal fibers; fluorocarbon, aluminum, and metal powders such as nickel powder; or conductive polymers such as polyaniline, polythiophene, polyacetylene, or polypyrrole may be used either alone or as a mixture.

The conductive additive may be added in an amount of 0.01% by weight to 30% by weight based on the total positive electrode active material layer weight.

The binder is for keeping the positive electrode active material on the positive electrode current collector, and organically linking the positive electrode active materials to further increase binding force between them, and all binders known in the art may be used.

Example of the binder may include one type selected from the group consisting of fluorine resin-based binders including polyvinylidene fluoride (PVdF) or polytetrafluoroethylene (PTFE); rubber-based binders including styrene butadiene rubber (SBR), acrylonitrile-butadiene rubber, or styrene-isoprene rubber; cellulose-based binders including carboxyl methyl cellulose (CMC), starch, hydroxypropyl cellulose, or regenerated cellulose; polyalcohol-based binders; polyolefin-based binders including polyethylene or polypropylene; polyimide-based binders; polyester-based binders; and silane-based binders, or mixtures, or copolymers of two or more types thereof.

The binder may be added in an amount of 0.5% by weight to 30% by weight based on the total positive electrode active material layer weight. When the binder content is less than 0.5% by weight, physical properties of the positive electrode decline eliminating the active material and the conductive additive in the positive electrode, and when the content is greater than 30% by weight, a ratio of the active material and the conductive additive relatively decreases in the positive electrode reducing battery capacity.

The positive electrode may be prepared using common methods known in the art. For example, the positive electrode may be prepared by preparing slurry by mixing a solvent, and, as necessary, additives such as a binder, a conductive additive and a filler to a positive electrode active material and stirring the result, then coating the slurry on a current collector made of a metal material, and compressing and drying the result.

Specifically, the binder may be dissolved in a solvent for preparing slurry first, and then a conductive additive may be dispersed thereinto. As the solvent for preparing the slurry, those capable of uniformly dispersing the positive electrode active material, the binder and the conductive additive and readily evaporating are preferably used, and typical examples thereof may include acetonitrile, methanol, ethanol, tetrahydrofuran, water, isopropyl alcohol and the like. Next, the positive electrode active material, or selectively together with the additives, may be uniformly dispersed again in the conductive additive-dispersed solvent to prepare positive electrode slurry. The amounts of the solvent, the positive electrode active material, or, selectively, the additives included in the slurry do not carry an important meaning in the present application, and it is sufficient that the slurry has proper viscosity to be readily coated. The slurry prepared as above may be coated on a current collector, and dried to form a positive electrode. The slurry may be coated on a current collector to a proper thickness depending on the slurry viscosity and the thickness of the positive electrode to form.

The coating may be conducted using methods commonly known in the art, and for example, the positive electrode active material slurry may be distributed on an upper surface of one side of the positive electrode current collector, and uniformly dispersing the slurry using a doctor blade or the like. In addition thereto, the coating may be conducted using a method such as die casting, comma coating, or screen printing.

The drying is not particularly limited, but may be conducted within 1 day in a vacuum oven of 50° C. to 200° C.

The positive electrode of the present invention prepared using the above-described compositions and method is classified by an SC factor value represented by the following Mathematical Formula 1.

$$SC \text{ factor} = \alpha \times \frac{L}{P} \qquad \text{[Mathematical Formula 1]}$$

(In Mathematical Formula 1,

P is porosity (%) of the positive electrode active material layer in the positive electrode, L is a mass of sulfur per unit area ($mg/cm^2$) of the positive electrode active material layer in the positive electrode, and α is 10 (constant)).

The lithium-sulfur secondary battery according to the present invention accomplishes high energy density by an organic binding of, as well as the positive electrode described above, a negative electrode, a separator, an electrolyte and the like, and according to the present invention, in order for the lithium-sulfur secondary battery to accomplish high energy density, the SC factor value may be 0.45 or greater and preferably 0.5 or greater. Although an upper limit of the SC factor value is not particularly limited in the present invention, the SC factor value may be 4.5 or less when considering actual operation of the lithium-sulfur secondary battery. In conventional lithium-sulfur secondary batteries, performance such as energy density of the battery declines when the SC factor value is 0.45 or greater, however, in the lithium-sulfur secondary battery according to the present invention, battery performance is maintained without declining in actual driving.

The negative electrode according to the present invention may be formed with a negative electrode current collector, and a negative electrode active material layer formed on one surface or both surfaces thereof. Alternatively, the negative electrode may be a lithium metal plate.

The negative electrode active material layer may include a negative electrode active material, and selectively, a conductive additive and a binder.

As the negative electrode active material, a material capable of reversibly intercalating or deintercalating lithium ions, a material capable of reversibly forming a lithium-containing compound by reacting with lithium ions, lithium metal or a lithium alloy may be used.

Examples of the material capable of reversibly intercalating or deintercalating lithium ions may include crystalline carbon, amorphous carbon or a mixture thereof.

Examples of the material capable of reversibly forming a lithium-containing compound by reacting with lithium ions may include tin oxide, titanium nitrate or silicon.

Examples of the lithium alloy may include alloys of lithium (Li) and metals selected from the group consisting of sodium (Na), potassium (K), rubidium (Rb), cesium (Cs), francium (Fr), beryllium (Be), magnesium (Mg), calcium (Ca), strontium (Sr), barium (Ba), radium (Ra), aluminum (Al), and tin (Sn).

As for constitutions of the current collector, the conductive additive, the binder and the like other than the negative electrode active material and a method for preparing a negative electrode, the materials, the methods and the like used in the positive electrode described above may be used.

The separator according to the present invention is a physical separator having a function of physically separating the positive electrode and the negative electrode, and is not particularly limited as long as it is used as a common separator, and those having an excellent electrolyte liquid moisture-containing ability while having low resistance for ion migration of the electrolyte liquid are particularly preferred.

In addition, the separator enables lithium ion transport between the positive electrode and the negative electrode while separating or insulating the positive electrode and the negative electrode from each other. Such a separator may be formed with porous, that is, 30% to 50% porosity, and non-conductive or insulating materials.

Specifically, porous polymer films, for example, porous polymer films prepared with a polyolefin-based polymer such as an ethylene homopolymer, a propylene homopolymer, an ethylene/butene copolymer, an ethylene/hexene copolymer and an ethylene/methacrylate copolymer may be used, or non-woven fabrics made of high melting point glass fiber or the like may be used. Among these, a porous polymer film is preferably used.

When using a polymer film as both a buffer layer and the separator, the amount of electrolyte liquid impregnation and ion conducting properties decline, and effects of reducing an overpotential and improving capacity properties become insignificant. Meanwhile, when using a non-woven fabric material as the both, mechanical strength is not secured causing a battery short circuit problem. However, when using a film-type separator and a polymer non-woven fabric buffer layer together, mechanical strength may also be secured together with an effect of improving battery performance obtained by employing the buffer layer.

Preferably, in the present invention, an ethylene homopolymer (polyethylene) polymer film may be used as the separator, and a polyimide non-woven fabric may be used as the buffer layer. Herein, the polyethylene polymer film preferably may have a thickness of 10 μm to 25 μm and porosity of 40% to 50%.

The electrolyte liquid according to the present invention is, as a non-aqueous electrolyte liquid including a lithium salt, formed with a lithium salt and a solvent. The electrolyte liquid has density of less than 1.5 $g/cm^3$. When the electrolyte liquid has density of 1.5 $g/cm^3$ or greater, the lithium-sulfur secondary battery is difficult to accomplish high energy density due to a weight increase in the electrolyte liquid.

The lithium salt is a material that may be readily dissolved in a non-aqueous organic solvent, and examples thereof may include at least one selected from the group consisting of LiCl, LiBr, LiI, LiClO$_4$, LiBF$_4$, LiB$_{10}$Cl$_{10}$, LiB(Ph)$_4$, LiC$_4$BO$_8$, LiPF$_6$, LiCF$_3$SO$_3$, LiCF$_3$CO$_2$, LiAsF$_6$, LiSbF$_6$, LiAlCl$_4$, LiSO$_3$CH$_3$, LiSO$_3$CF$_3$, LiSCN, LiC(CF$_3$SO$_2$)$_3$, LiN(CF$_3$SO$_2$)$_2$, LiN(C$_2$F$_5$SO$_2$)$_2$, LiN(SO$_2$F)$_2$, chloroborane lithium, lower aliphatic carboxylic acid lithium, and lithium imide. In one embodiment of the present invention, the lithium salt may be preferably lithium imide such as LiTFSI.

The concentration of the lithium salt may be from 0.1 M to 8.0 M, preferably from 0.5 M to 5.0 M and more preferably from 1.0 to 3.0 M depending on various factors such as an accurate composition of the electrolyte liquid mixture, solubility of the salt, conductivity of the dissolved salt, charge and discharge conditions of a battery, a working temperature, and other factors known in the lithium secondary battery field. When the concentration of the lithium salt is less than the above-mentioned range, conductivity of the electrolyte liquid may decrease causing decline in the battery performance, and when the concentration of the lithium salt is greater than the above-mentioned range, viscosity of the electrolyte liquid increases leading to a decrease in the lithium ion (Li$^+$) mobility, and therefore, a proper concentration is preferably selected in the above-mentioned range.

The solvent includes a first solvent and a second solvent. The first solvent has a highest dipole moment per unit volume among the constituents included in an amount of 1% by weight or greater in the solvent, and accordingly, has high dipole moment and low viscosity. Using a solvent with a high dipole moment is effective in improving solid-state reactivity of sulfur, and such an effect may be favorably obtained when the solvent itself has low viscosity. In the present invention, the first solvent is classified by a DV$^2$ factor represented by the following Mathematical Formula 2.

$$DV^2 \text{ factor} = \gamma \times \frac{\mu}{DV} \qquad \text{[Mathematical Formula 2]}$$

(In Mathematical Formula 2,
DV is a dipole moment per unit volume (D·mol/L),
μ is viscosity of the solvent (cP, 25° C.), and
γ is 100 (constant)).

According to the present invention, the DV$^2$ factor value may be 1.75 or less, and preferably 1.5 or less. Although a lower limit of the DV$^2$ factor value is not particularly limited in the present invention, the DV$^2$ factor value may be 0.1 or greater when considering actual operation of the lithium-sulfur secondary battery. When mixing a solvent having a DV$^2$ factor value of 1.75 or less such as the first solvent, battery performance does not decline even when using a positive electrode having low porosity and having a high loading amount of sulfur, a positive electrode active material, in a lithium-sulfur battery since functionality of an electrolyte liquid may be maintained the same.

In the present invention, the first solvent is not particularly limited in the type as long as it has the DV$^2$ factor value included in the above-mentioned range, but may include at least one selected from the group consisting of propionitrile, dimethylacetamide, dimethylformamide, gamma-butyrolactone, triethylamine, and 1-iodopropane.

The first solvent may be included in an amount of 1% by weight to 50% by weight, preferably in an amount of 5% by weight to 40% by weight and more preferably in an amount of 10% by weight to 30% by weight based on the total weight of the solvent forming the electrolyte liquid. When the solvent according to the present invention includes the first solvent in the above-described % by weight range, an effect of improving battery performance may be obtained even when using together with a positive electrode having low porosity and a high loading amount of sulfur, a positive electrode active material.

The lithium-sulfur secondary battery of the present invention is further classified by an NS factor combining the SC factor and the DV$^2$ factor. The NS factor is represented by the following Mathematical Formula 3.

$$NS \text{ factor} = \frac{DV^2 \text{ factor}}{SC \text{ factor}} \qquad \text{[Mathematical Formula 3]}$$

(In Mathematical Formula 3,
SC factor has the same value as defined in Mathematical Formula 1, and
DV$^2$ factor has the same value as defined in Mathematical Formula 2).

In the present invention, the NS factor value may be 3.5 or less, preferably 3.0 or less and more preferably 2.7 or less. Although a lower limit of the NS factor value is not particularly limited in the present invention, the NS factor value may be 0.1 or greater when considering actual operation of the lithium-sulfur secondary battery. When the NS factor value is adjusted to be in the above-mentioned range, an effect of improving performance of the lithium-sulfur secondary battery may be more superior.

In the present invention, the second solvent is a fluorinated ether-based solvent. In order to control viscosity of an electrolyte liquid in the prior art, solvents such as dimethoxyethane and dimethyl carbonate have been used as a diluent, and when using such a solvent as a diluent, a battery including a high loading and low porosity positive electrode as in the present invention may not be driven. Accordingly, in the present invention, the second solvent is added with the first solvent in order to drive the positive electrode according to the present invention. The second solvent is not particularly limited in the type as long as it is a fluorinated ether-based solvent generally used in the art, but may include at least one selected from the group consisting of 1H,1H,2'H,3H-decafluorodipropyl ether, difluoromethyl 2,2,2-trifluoroethyl ether, 1,2,2,2-tetrafluoroethyl trifluoromethyl ether, 1,1,2,3,3,3-hexafluoropropyl difluoromethyl ether, pentafluoroethyl 2,2,2-trifluoroethyl ether, and 1H,1H, 2'H-perfluorodipropyl ether.

The second solvent may be included in an amount of 50% by weight to 99% by weight, preferably in an amount of 60% by weight to 95% by weight and more preferably in an amount of 70% by weight to 90% by weight based on the total weight of the solvent forming the electrolyte liquid. When the solvent according to the present invention includes the second solvent in the above-described % by weight range, an effect of improving battery performance may be obtained even when using together with a positive electrode having low porosity and a high loading amount of sulfur, a positive electrode active material, like the first solvent. When mixing the first solvent and the second solvent, the second solvent may be included in the electrolyte liquid in the same or more amount compared to the first solvent considering a battery performance improving effect. According to the present invention, the solvent may include the first solvent and the second solvent in a weight ratio of 1:1 to 1:9 and preferably 3:7 to 1:9 (first solvent:second solvent).

The non-aqueous electrolyte liquid for a lithium-sulfur battery of the present invention may further include a nitrate or nitrite-based compound as an additive. The nitrate or nitrite-based compound is effective in forming a stable film on the lithium electrode and enhancing charge and discharge efficiency. Such a nitrate or nitrite-based compound is not particularly limited in the present invention, however, one type selected from the group consisting of inorganic-based nitrate or nitrite compounds such as lithium nitrate ($LiNO_3$), potassium nitrate ($KNO_3$), cesium nitrate ($CsNO_3$), barium nitrate ($Ba(NO_3)_2$), ammonium nitrate ($NH_4NO_3$), lithium nitrite ($LiNO_2$), potassium nitrite ($KNO_2$), cesium nitrite ($CsNO_2$) and nitrite ammonium ($NH_4NO_2$); organic-base nitrate or nitrite compounds such as methyl nitrate, dialkyl imidazolium nitrate, guanidine nitrate, imidazolium nitrate, pyridinium nitrate, ethyl nitrite, propyl nitrite, butyl nitrite, pentyl nitrite and octyl nitrite; organic nitro compounds such as nitromethane, nitropropane, nitrobutane, nitrobenzene, dinitrobenzene, nitro pyridine, dinitropyridine, nitrotoluene and dinitrotoluene, and combinations thereof may be used, and preferably, lithium nitrate is used.

In addition, the electrolyte liquid may further include other additives with the purpose of improving charge and discharge properties, flame retardancy and the like. Examples of the additive may include pyridine, triethylphosphite, triethanolamine, cyclic ether, ethylenediamine, n-glyme, hexaphosphoric acid triamide, nitrobenzene derivatives, sulfur, quinoneimine dyes, N-substituted oxazolidinone, N,N-substituted imidazolidine, ethylene glycol dialkyl ether, ammonium salts, pyrrole, 2-methoxyethanol, aluminum trichloride, fluoroethylene carbonate (FEC), propene sultone (PRS), vinylene carbonate (VC), and the like.

The lithium-sulfur secondary battery according to the present invention is classified by an ED factor value represented by the following Mathematical Formula 4.

$$ED \text{ factor} = V \times SC \text{ factor} \times \frac{C}{D} \quad \text{[Mathematical Formula 4]}$$

(In Mathematical Formula 4,

V is a discharge nominal voltage (V) for $Li/Li^+$,

SC factor has the same value as defined in Mathematical Formula 1,

C is discharge capacity (mAh/g) when discharging at a 0.1 C rate, and

D is density (g/cm$^3$) of the electrolyte liquid).

The ED factor may accomplish high energy density in an actual lithium-sulfur secondary battery as the value is higher. According to the present invention, the ED factor value may be 950 or greater, preferably 1100 or greater and more preferably 1150 or greater. Although an upper limit of the ED factor value is not particularly limited in the present invention, the ED factor value may be 10000 or less when considering actual operation of the lithium-sulfur secondary battery. The ED factor value range means that the lithium-sulfur secondary battery according to the present invention is capable of obtaining more enhanced energy density compared to conventional lithium-sulfur secondary batteries.

The lithium-sulfur secondary battery of the present invention may be manufactured by disposing a separator between a positive electrode and a negative electrode to form an electrode assembly, placing the electrode assembly in a cylindrical battery case or an angular battery case, and then injecting an electrolyte thereto. Alternatively, the lithium-sulfur secondary battery of the present invention may also be manufactured by laminating the electrode assembly, impregnating the electrode assembly into an electrolyte, and placing the obtained result in a battery case and sealing the result.

In addition, the present invention provides a battery module including the lithium-sulfur secondary battery as a unit cell.

The battery module may be used as a power supply of medium to large-sized devices requiring high-temperature stability, long cycle properties and high capacity properties.

Examples of the medium to large-sized device may include power tools operated through receiving electric power by a battery motor; electric vehicles including electric vehicles (EV), hybrid electric vehicles (HEV), plug-in hybrid electric vehicles (PHEV) and the like; electric two-wheeled vehicles including electric bikes (e-bikes) and electric scooters (e-scooters); electric golf carts; systems for power storage, and the like, but are not limited thereto.

Mode for Invention

Hereinafter, preferred examples will be provided in order to illuminate the present invention, however, the following examples are for illustrative purposes only, and it will be obvious to those skilled in the art that various changes and modifications may be made within the category and technological ideas of the present invention, and such changes and modifications also fall within the scope of the attached claims.

PREPARATION EXAMPLE

Preparation Example 1

After dispersing iron phthalocyanine (FePc, product of Sigma Aldrich) (60 mg), a catalytic site, into N,N-dimethylformamide (DMF) (500 ml), a solvent, the result was bath sonicated for 10 minutes to prepare an iron phthalocyanine (FePc) dispersion liquid.

Subsequently, to the iron phthalocyanine (FePc) dispersion liquid prepared above, a carbon nanotube (product of CNano Technology) (940 mg) was added, and the result was bath sonicated for 10 minutes and stirred at a rate of 500 rpm for 4 hours at room temperature to obtain a mixture solution.

Then, the mixture solution prepared above was filtered using a vacuum pump and then washed with ethanol (1000 ml), and upper layer powder of the mixture solution obtained from the filtration and the washing was dried for 12 hours at 80° C. to prepare a carbon nanotube (FePc-CNT) having iron phthalocyanine (FePc) introduced as a catalytic site.

EXAMPLE AND COMPARATIVE EXAMPLE

Example 1

A sulfur-carbon mixture was prepared by evenly mixing sulfur ($S_8$) and the catalytic site-introduced carbon nanotube (FePc-CNT) prepared in Preparation Example 1 in a weight ratio of 70:30, and the sulfur-carbon mixture was left in a 155° C. oven for 30 minutes to prepare a sulfur-carbon composite.

The sulfur-carbon composite prepared above, a conductive additive and a binder were mixed to prepare slurry for forming a positive electrode active material layer. Herein, vapor grown carbon fiber was used as the conductive additive, and styrene butadiene rubber/carboxymethyl cellulose (SBR/CMC 7:3) was used as a binder. The mixing ratio herein was employed such that the sulfur-carbon composite:the conductive additive:the binder was 90:5:5 in a weight ratio.

The slurry prepared as above was coated on an aluminum foil current collector having a thickness of 20 μm, and then dried to prepare a positive electrode (energy density of positive electrode: 4.3 mAh/cm$^2$). In the prepared positive electrode, porosity of the positive electrode active material layer calculated based on the measurements of electrode weight and electrode thickness (using a TESA-μHITE device of TESA) was 60%, and the sulfur mass per unit area of the positive electrode active material layer was 3.0 mg/cm$^2$. The SC factor value calculated based thereon was 0.5.

The positive electrode prepared using the above-described method and a negative electrode were placed to face each other, and a separator was interposed therebetween to prepare an electrode assembly. Herein, lithium foil having a thickness of 60 μm was used as the negative electrode, and polyethylene having a thickness of 20 μm and porosity of 45% was used as the separator.

Subsequently, the electrode assembly was placed inside a case, and an electrolyte liquid was injected thereto to manufacture a lithium-sulfur secondary battery. Herein, the electrolyte liquid was prepared by dissolving lithium bis(trifluoromethylsulfonyl)imide (LiTFSI) having a 3 M concentration in an organic solvent, and as the organic solvent herein, a solvent obtained by mixing propionitrile (first solvent) and 1H,1H,2'H,3H-decafluorodipropyl ether (second solvent) in a 3:7 weight ratio was used. A dipole moment per unit volume was 97.1 D·mol/L in the first solvent, and viscosity of the solvent measured using a LVDV2T-CP viscometer of BROOKFIELD AMETEK, Inc. was 0.38 cP (25° C.) The DV$^2$ factor value calculated based thereon was 0.39. The manufactured battery was charged and discharged at two temperatures of 25° C. and 45° C.

Comparative Example 1

A lithium secondary battery was prepared in the same manner as in Example 1 except that an untreated common carbon nanotube (product of CNano Technology) was used in the same amount instead of the catalytic site-introduced carbon nanotube of Preparation Example 1 when preparing the sulfur-carbon composite. Herein, in the prepared positive electrode, porosity of the positive electrode active material layer calculated based on the measurements of electrode weight and electrode thickness (using a TESA-μHITE device manufactured by TESA) was 60%, and the sulfur mass per unit area of the positive electrode active material layer was 3.0 mg/cm$^2$. An SC factor value calculated based thereon was 0.5.

Comparative Example 2

A lithium secondary battery was prepared in the same manner as in Example 1 except that an electrolyte liquid including a second electrolyte liquid composition was used. The electrolyte liquid including a second electrolyte liquid composition was prepared by dissolving lithium bis(trifluoromethyl sulfonyl)imide (LiTFSI) having a concentration of 1 M and 1% by weight of lithium nitrate in an organic solvent, and as the organic solvent herein, a solvent obtained by mixing 1,3-dioxolane (first solvent) and dimethoxyethane (second solvent) in a weight ratio of 5:5 was used. In the first solvent, a dipole moment per unit volume was 97.1 D·mol/L, and viscosity of the solvent measured using a LVDV2T-CP viscometer manufactured by BROOKFIELD AMETEK Inc. was 0.38 cP (25° C.). A DV$^2$ factor value calculated based thereon was 1.77. The manufactured battery was charged and discharged at 25° C.

Conditions of the example and the comparative examples were summarized and shown in the following Table 1.

TABLE 1

|  | Electrolyte Liquid Composition | SC factor | DV$^2$ factor | NS factor | ED factor (0.1 C) |
|---|---|---|---|---|---|
| Example 1 (25° C.) | First Electrolyte Liquid Composition[1] | 0.5 | 0.39 | 0.78 | 1254 |
| Example 1 (45° C.) |  | 0.5 | 0.39 | 0.78 | 1480 |
| Comparative Example 1 (25° C.) |  | 0.5 | 0.39 | 0.78 | 1218 |
| Comparative Example 1 (45° C.) |  | 0.5 | 0.39 | 0.78 | 1472 |
| Comparative Example 2 (25° C.) | Second Electrolyte Liquid Composition[2] | 0.42 | 1.77 | 4.21 | 914 |

[1]First electrolyte liquid composition = Propionitrile:1H, 1H, 2'H, 3H-Decafluorodipropyl ether (3:7, w/w) solvent, 3.0M LiTFSI
[2]Second electrolyte liquid composition = 1,3-Dioxolane (DOL):Dimethyl ether (DME) (5:5, v/v) solvent, 1.0M LiTFSI, 1% by weight LiNO$_3$ Experimental Example 1. Performance Evaluation on Lithium-Sulfur Secondary Battery Performance of each of the lithium-sulfur secondary batteries manufactured in Example 1, Comparative Example 1 and Comparative Example 2 was evaluated using a charge and discharge measurement device (LAND CT-2001A, Wuhan, China).

For each of the lithium-sulfur secondary batteries, measurements were made over 3 times at two temperatures of 25° C. and 45° C. under a condition of 2.5 cycles of 0.1 C (0.55 mA·cm$^{-2}$) charge/0.1 C (0.55 mA·cm$^{-2}$) discharge, then 3 cycles of 0.2 C (1.1 mA·cm$^{-2}$) charge/0.2 C (1.1 mA·cm$^{-2}$) discharge, and then 0.3 C (1.65 mA·cm$^{-2}$) charge/0.5 C (2.65 mA·cm$^{-2}$) discharge. The results obtained herein were shown in Table 2, FIG. 4 and FIG. 5.

TABLE 2

|  |  | Example 1 | Comparative Example 1 | Comparative Example 2 | ΔV$_n$ (%) |
|---|---|---|---|---|---|
| Discharge Voltage (V) | 25° C. | 1.90 | 1.85 | 2.13 | 2.7 |
|  | 45° C. | 2.08 | 2.07 | — | 0.5 |

Figure 4:
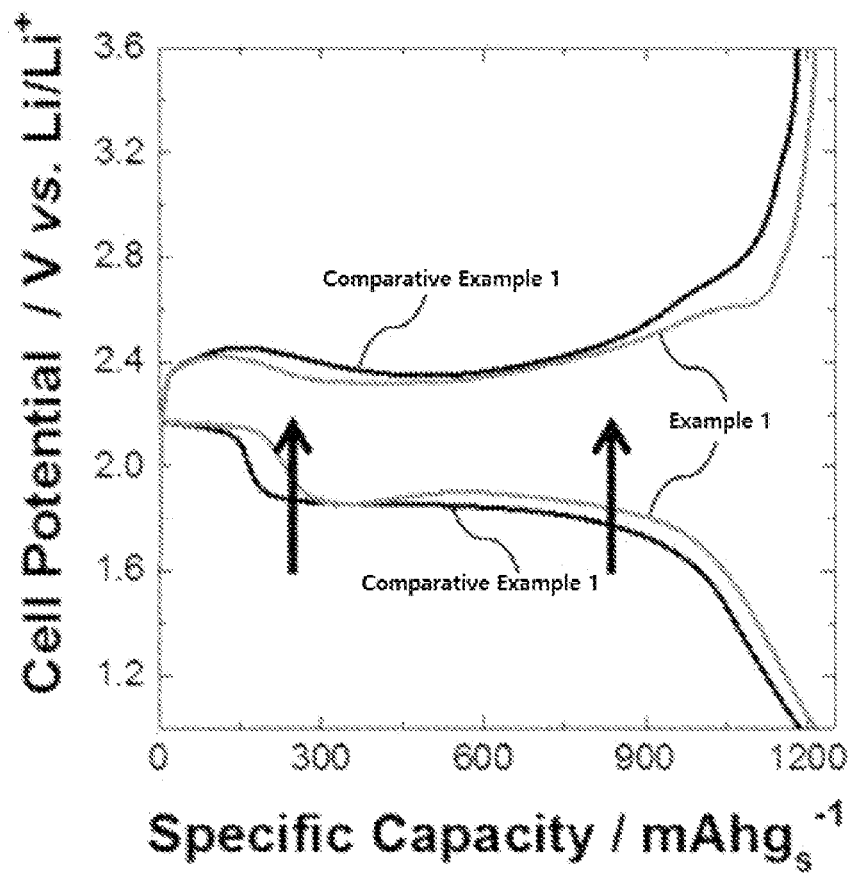
FIG. 4 is a graph presenting results of performance evaluation on lithium-sulfur secondary batteries according to Experimental Example 1 of the present invention at 25° C.
Figure 5:
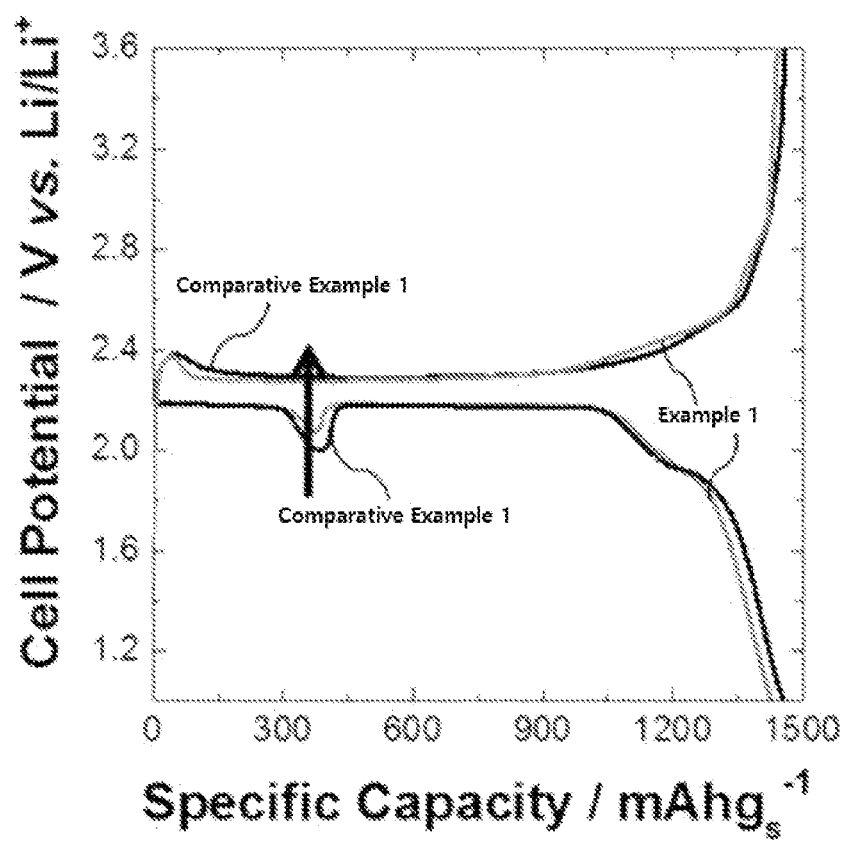
FIG. 5 is a graph presenting results of performance evaluation on lithium-sulfur secondary batteries according to Experimental Example 1 of the present invention at 45° C.

As shown in FIG. 4 and FIG. 5, it was identified that the lithium-sulfur secondary battery including the positive electrode according to the present invention had excellent discharge capacity and overvoltage properties compared to Comparative Examples 1 and 2.

When referring to FIG. 4, it was identified that, when evaluating performance of each of the lithium-sulfur secondary batteries manufactured in Example 1 and Comparative Example 1 at 25° C., the lithium-sulfur secondary battery of Example 1 had a significantly improved overpotential at initial discharge compared to the lithium-sulfur secondary battery of Comparative Example 1, and discharge capacity was improved as well.

In addition, when evaluating performance of each of the lithium-sulfur secondary batteries manufactured in Example 1 and Comparative Example 1 at 45° C., it was identified that the lithium-sulfur secondary battery of Example 1 was improved in the potential drop, a phenomenon occurring near 350 mAh/g, compared to the lithium-sulfur secondary battery of Comparative Example 1 as shown in FIG. 5.

In addition thereto, when referring to Table 2, it was identified that the discharge nominal voltage ($V_n$) increased in Example 1 by 2.7% at 25° C., and by 0.5% at 45° C. compared to Comparative Example 1. Through this, it can be seen that the catalytic site effect is maximized at room temperature.

From such results, it was seen that, by the lithium-sulfur secondary battery of the present invention including a sulfur-carbon composite including a catalytic site-introduced porous carbon material in a positive electrode, and by the positive electrode and the electrolyte liquid satisfying specific conditions, an overvoltage improving effect was significantly superior, and higher energy density that has not been able to obtain in conventional lithium-sulfur secondary batteries was able to be stably obtained.

REFERENCE NUMERAL

10: Porous Carbon Material
11: Pore
20: Catalytic Site
30: Sulfur-based Compound

The invention claimed is:

1. A lithium-sulfur secondary battery comprising:
a positive electrode;
a negative electrode;
a separator; and
an electrolyte liquid,
wherein the positive electrode comprises a sulfur-carbon composite including a catalytic site-introduced porous carbon material; and
the positive electrode has an SC factor value represented by the following Mathematical Formula 1 of 0.45 or greater:

$$SC \text{ factor} = \alpha \times \frac{L}{P} \qquad \text{[Mathematical Formula 1]}$$

in Mathematical Formula 1,
P is porosity (%) of a positive electrode active material layer in the positive electrode;
L is a mass of sulfur per unit area (mg/cm²) of the positive electrode active material layer in the positive electrode; and
α is 10,
wherein the SC factor defines the relationship between α, P, and L,
wherein the electrolyte liquid comprises a solvent and a lithium salt; and
the solvent comprises a first solvent having a $DV^2$ factor value represented by the following Mathematical Formula 2 of 1.75 or less and a second solvent that is a fluorinated ether-based solvent:

$$DV^2 \text{ factor} = \gamma \times \frac{\mu}{DV} \qquad \text{[Mathematical Formula 2]}$$

in Mathematical Formula 2,
DV is a dipole moment per unit volume (D·mol/L); μ is viscosity of the solvent (cP, 25° C.); and γ is 100, wherein the $DV^2$ factor defines the relationship between μ, γ, and DV; and
wherein the first solvent is present in the solvent in an amount of 1% by weight to 50% by weight based on a total weight of the solvent,
wherein the catalytic site comprises at least one selected from the group consisting of iron phthalocyanine, nickel phthalocyanine, manganese phthalocyanine, copper phthalocyanine, cobalt phthalocyanine, and zinc phthalocyanine.

2. The lithium-sulfur battery of claim 1, wherein the catalytic site is present in an amount of 1% by weight to 20% by weight based on a total weight of the catalytic site-introduced porous carbon material.

3. The lithium-sulfur battery of claim 1, wherein the catalytic site is positioned on at least one of an outer surface of the porous carbon material and an inner surface of pores of the porous carbon material.

4. The lithium-sulfur battery of claim 1, wherein the catalytic site bonds to a surface of the porous carbon material through π electron interaction.

5. The lithium-sulfur battery of claim 1, wherein the porous carbon material includes comprises one or more types selected from the group consisting of graphite, graphene, reduced graphene oxide, carbon black, carbon nanotube, carbon fiber, and activated carbon.

6. The lithium-sulfur secondary battery of claim 1, wherein the first solvent has a $DV^2$ factor value of 1.5 or less.

7. The lithium-sulfur secondary battery of claim 1, wherein the lithium-sulfur secondary battery has an NS factor value represented by the following Mathematical Formula 3 of 3.5 or less:

$$NS \text{ factor} = \frac{DV^2 \text{ factor}}{SC \text{ factor}} \qquad \text{[Mathematical Formula 3]}$$

in Mathematical Formula 3,
SC factor has the same value as defined in Mathematical Formula 1; and
$DV^2$ factor has the same value as defined in Mathematical Formula 2,
wherein the NS factor defines the relationship between the $DV^2$ factor and the SC factor.

8. The lithium-sulfur secondary battery of claim 1, wherein the lithium-sulfur secondary battery has an ED factor value represented by the following Mathematical Formula 4 of 950 or greater:

$$ED \text{ factor} = V \times SC \text{ factor} \times \frac{C}{D} \qquad \text{[Mathematical Formula 4]}$$

in Mathematical Formula 4,
V is a discharge nominal voltage (V) for Li/Li⁺; and
SC factor has the same value as defined in Mathematical Formula 1;
C is discharge capacity (mAh/g) when discharging at a 0.1 C rate; and
D is density (g/cm³) of the electrolyte liquid,
wherein the ED factor defines the relationship between V, SC factor, C and D.

9. The lithium-sulfur secondary battery of claim 1, wherein the first solvent comprises at least one selected from the group consisting of propionitrile, dimethylacetamide, dimethylformamide, gamma-butyrolactone, triethylamine, and 1-iodopropane.

10. The lithium-sulfur secondary battery of claim 1, wherein the second solvent comprises at least one selected from the group consisting of 1H,1H,2'H,3H-decafluorodipropyl ether, difluoromethyl 2,2,2-trifluoroethyl ether, 1,2,2,2-tetrafluoroethyl trifluoromethyl ether, 1,1,2,3,3,3-hexafluoropropyl difluoromethyl ether, pentafluoroethyl 2,2,2-trifluoroethyl ether, and 1H,1H,2'H-perfluorodipropyl ether.

11. The lithium-sulfur secondary battery of claim 1, wherein the second solvent is present in the solvent in an amount of 50% by weight to 99% by weight based on a total weight of the solvent.

12. The lithium-sulfur secondary battery of claim 1, wherein the first solvent and the second solvent are present in the solvent in a weight ratio of 3:7 to 1:9.

* * * * *